United States Patent
Buczynski

(10) Patent No.: US 12,534,028 B2
(45) Date of Patent: Jan. 27, 2026

(54) STAMPED METAL TRIM RETAINER

(71) Applicant: Illinois Tool Works Inc., Glenview, IL (US)

(72) Inventor: Gregory G. Buczynski, Ferndale, MI (US)

(73) Assignee: Illinois Tool Works Inc., Glenview, IL (US)

( * ) Notice: Subject to any disclaimer, the term of this patent is extended or adjusted under 35 U.S.C. 154(b) by 415 days.

(21) Appl. No.: 17/191,284

(22) Filed: Mar. 3, 2021

(65) Prior Publication Data

US 2021/0276497 A1 Sep. 9, 2021

Related U.S. Application Data

(60) Provisional application No. 62/984,412, filed on Mar. 3, 2020.

(51) Int. Cl.
 *B60R 13/02* (2006.01)
 *F16B 5/06* (2006.01)

(52) U.S. Cl.
 CPC ........ *B60R 13/0206* (2013.01); *F16B 5/0664* (2013.01)

(58) Field of Classification Search
 CPC ............... B60R 13/0206; F16B 5/0664; F16B 19/1081; F16B 5/065

(Continued)

(56) References Cited

U.S. PATENT DOCUMENTS

| 4,122,583 A | 10/1978 | Grittner |
| 4,610,588 A | 9/1986 | Van Buren, Jr. et al. |

(Continued)

FOREIGN PATENT DOCUMENTS

| DE | 202007002704 | 7/2008 |
| DE | 102012001195 | 7/2013 |

(Continued)

OTHER PUBLICATIONS

Int'l Search Report and Written Opinion Appln No. PCT/IB2021/050611 mailed May 31, 2021.

(Continued)

*Primary Examiner* — Lindsay M Low
*Assistant Examiner* — Omar Morales
(74) *Attorney, Agent, or Firm* — McAndrews, Held & Malloy, Ltd.

(57) ABSTRACT

Disclosed are systems and methods for retaining system coupling a first panel to a second panel via a retainer. The retainer comprises a body portion, a pair of flanges, a plurality of wings, and one or more retaining tabs. The body portion may employed a pair of legs that are spaced apart and flexibly connected to one another at a first end to define a channel. The channel is configured to receive and/or engage a bezel associated with the first panel. The pair of flanges are connected to and extends outwardly from a second end of its respective leg. The plurality of wings are coupled to the pair of legs and canted outwardly from the body portion. The plurality of wings are configured to engaged, for example, a retaining ledge of the second panel when the bezel is inserted in the channel. The one or more retaining tabs extending inwardly from one of the pair of legs and engage the bezel.

18 Claims, 9 Drawing Sheets

(58) Field of Classification Search
USPC .................................................. 296/1.08
See application file for complete search history.

(56) References Cited

U.S. PATENT DOCUMENTS

| | | | |
|---|---|---|---|
| 4,717,301 A | 1/1988 | Oddenino | |
| 4,920,618 A | 5/1990 | Iguchi | |
| 4,960,354 A | 10/1990 | Moore | |
| 5,051,021 A | 9/1991 | Pelz | |
| 5,195,793 A | 3/1993 | Maki | |
| 5,301,396 A | 4/1994 | Benoit | |
| 5,509,182 A | 4/1996 | Nakanishi | |
| 5,671,513 A | 9/1997 | Kawahara | |
| D405,828 S | 2/1999 | Richter | |
| 6,047,675 A | 4/2000 | Kunz | |
| 6,074,150 A | 6/2000 | Shinozaki | |
| 6,231,109 B1 | 5/2001 | Beaver | |
| 6,253,423 B1 | 7/2001 | Friedrich | |
| 6,449,814 B1 | 9/2002 | Dinsmore | |
| 6,481,682 B2 | 11/2002 | Miura | |
| 6,712,329 B2 | 3/2004 | Ishigami | |
| 6,715,185 B2 | 4/2004 | Angellotti | |
| 6,796,006 B2 | 9/2004 | Hansen | |
| 6,854,946 B2 | 2/2005 | Bauer | |
| D510,257 S | 10/2005 | Marty | |
| 7,114,221 B2 | 10/2006 | Gibbons | |
| 7,152,281 B2 | 12/2006 | Scroggie | |
| 7,178,855 B2 | 2/2007 | Catron et al. | |
| 7,231,696 B2 | 6/2007 | Asano | |
| 7,300,089 B2 | 11/2007 | Kuroda | |
| 7,401,388 B2 | 7/2008 | Hansen | |
| 7,413,371 B2 | 8/2008 | Arnold | |
| 7,444,721 B2 | 11/2008 | Smith | |
| 7,536,755 B2 | 5/2009 | Nakajima | |
| D625,580 S | 10/2010 | Giordano | |
| 7,900,953 B2 | 3/2011 | Slobodecki et al. | |
| 7,954,205 B2 | 6/2011 | Xueyong | |
| 8,046,880 B2 | 11/2011 | Katoh | |
| 8,056,193 B2 | 11/2011 | Park | |
| 8,322,001 B2 | 12/2012 | Ehrhardt | |
| 8,511,631 B2 | 8/2013 | Kato | |
| 8,528,295 B2 | 9/2013 | Glynn et al. | |
| 8,585,121 B2 | 11/2013 | Marx | |
| 8,613,128 B2 | 12/2013 | Moerke | |
| 8,671,528 B2 | 3/2014 | Hayashi | |
| 8,683,662 B2 | 4/2014 | Cooley et al. | |
| 8,834,087 B2 | 9/2014 | Kirchen | |
| 8,875,357 B2 | 11/2014 | Réznar | |
| 8,979,156 B2 | 3/2015 | Mally | |
| 9,079,341 B2 | 7/2015 | Risdale | |
| 9,303,665 B2 | 4/2016 | Steltz et al. | |
| D759,475 S | 6/2016 | Banno | |
| D759,476 S | 6/2016 | Iwahara | |
| D767,372 S | 9/2016 | Itou | |
| 9,982,694 B2 | 5/2018 | Scroggie | |
| 10,125,804 B2 | 11/2018 | Krippl | |
| D845,120 S | 4/2019 | Kosidlo | |
| 10,471,909 B2 | 11/2019 | Abe | |
| D876,207 S | 2/2020 | Elliott | |
| D934,063 S | 10/2021 | Buczynski | |
| D936,458 S | 11/2021 | Wu | |
| 2003/0200634 A1 | 10/2003 | Hansen | |
| 2003/0233738 A1* | 12/2003 | Osterland | F16B 5/125 24/293 |
| 2004/0016088 A1 | 1/2004 | Angellotti | |
| 2005/0271492 A1* | 12/2005 | Jackson, Jr. | F16B 21/076 411/112 |
| 2007/0107174 A1 | 5/2007 | Bordas | |
| 2008/0052878 A1 | 3/2008 | Lewis et al. | |
| 2009/0188086 A1 | 7/2009 | Okada | |
| 2010/0146747 A1 | 6/2010 | Reznar | |
| 2011/0314646 A1* | 12/2011 | Ribes Marti | F16B 2/241 24/530 |
| 2012/0073089 A1 | 3/2012 | Buillas | |
| 2012/0301218 A1* | 11/2012 | De Jong | F16B 21/07 403/326 |
| 2015/0113773 A1 | 4/2015 | Iwahara | |
| 2015/0128386 A1 | 5/2015 | Lepper | |
| 2015/0322985 A1 | 11/2015 | Scroggie | |
| 2015/0337882 A1 | 11/2015 | Iwahara | |
| 2016/0129854 A1 | 5/2016 | Bachelder | |
| 2016/0290380 A1 | 10/2016 | Fellows | |
| 2016/0368433 A1 | 12/2016 | Vega Velazquez | |
| 2017/0051780 A1 | 2/2017 | Dickinson | |
| 2017/0129421 A1 | 5/2017 | Dickinson | |
| 2017/0268550 A1 | 9/2017 | Michelini | |
| 2018/0128297 A1 | 5/2018 | Meyers | |
| 2019/0048911 A1 | 2/2019 | Bidlake | |
| 2020/0232495 A1 | 7/2020 | Lepper | |
| 2021/0221492 A1 | 7/2021 | Vincon | |
| 2021/0276497 A1 | 9/2021 | Buczynski | |

FOREIGN PATENT DOCUMENTS

| | | |
|---|---|---|
| EP | 1363069 | 11/2003 |
| EP | 3557086 A1 | 10/2019 |
| GB | 2167515 | 5/1986 |
| WO | 2015175098 A1 | 11/2015 |
| WO | 2016073231 A1 | 5/2016 |
| WO | 2016144438 A1 | 9/2016 |
| WO | 2017164967 A1 | 9/2017 |
| WO | 2018147984 A1 | 8/2018 |
| WO | 2019040301 A1 | 2/2019 |
| WO | 2021152468 | 8/2021 |

OTHER PUBLICATIONS

NPL Exam Report for German Patent Application No. 10 2021 101 760.2, dated Sep. 23, 2022 (4 pages).

* cited by examiner

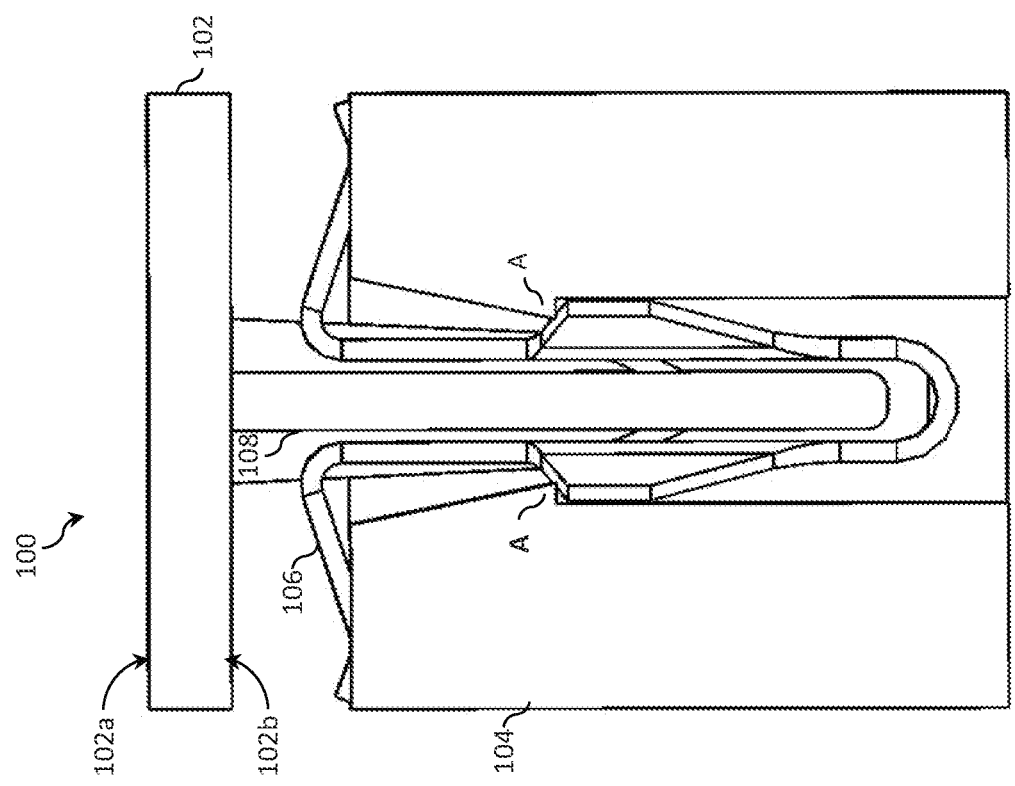
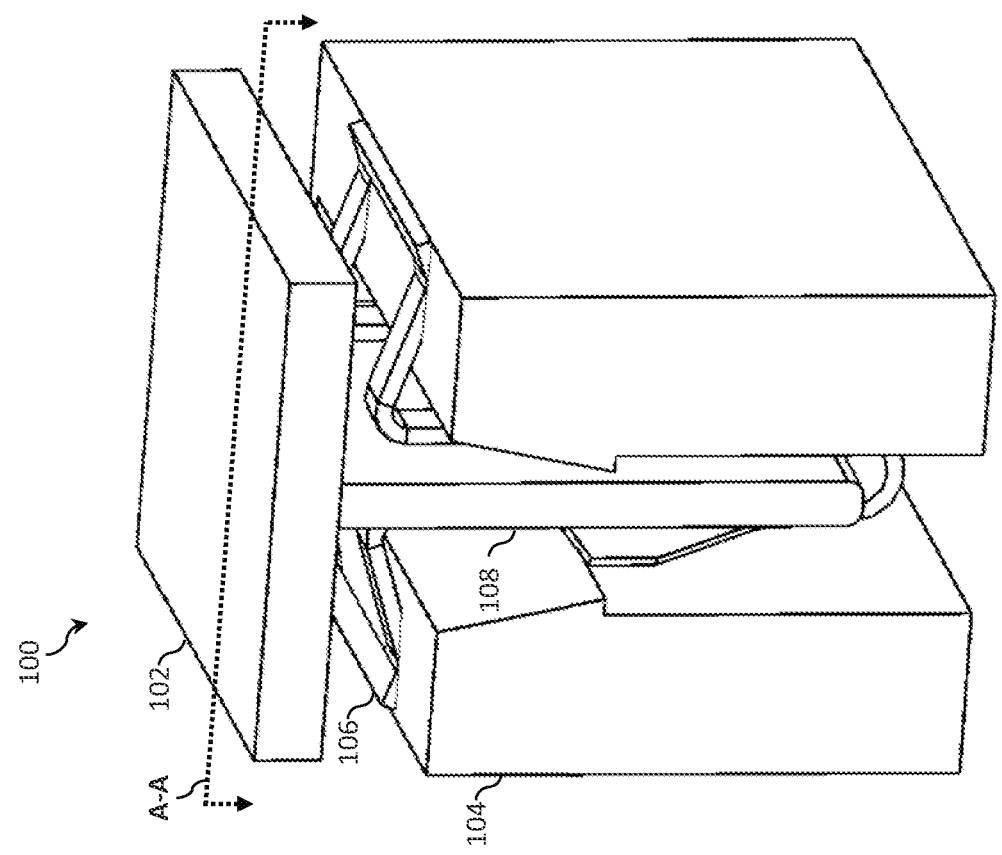
FIG. 1b
FIG. 1a

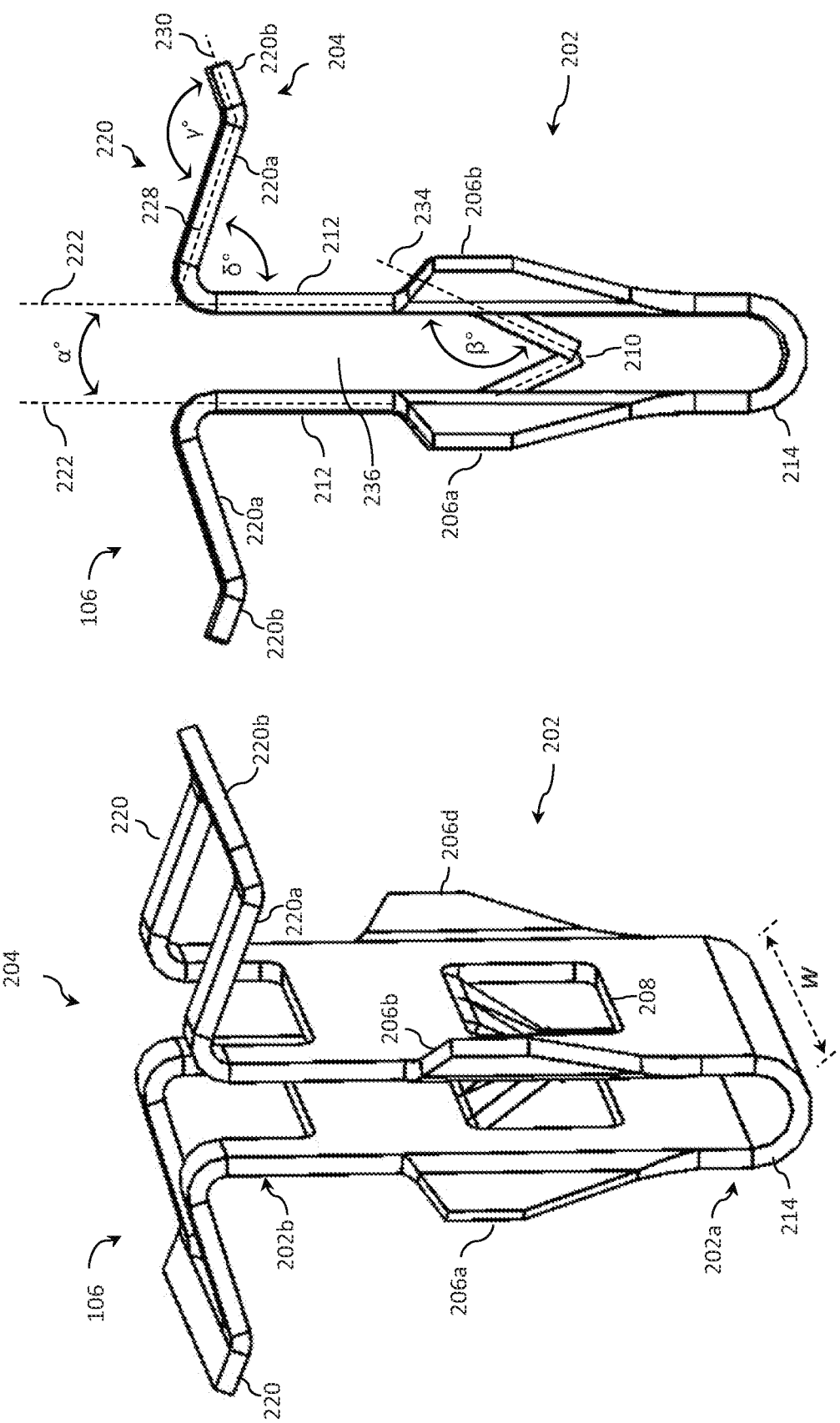

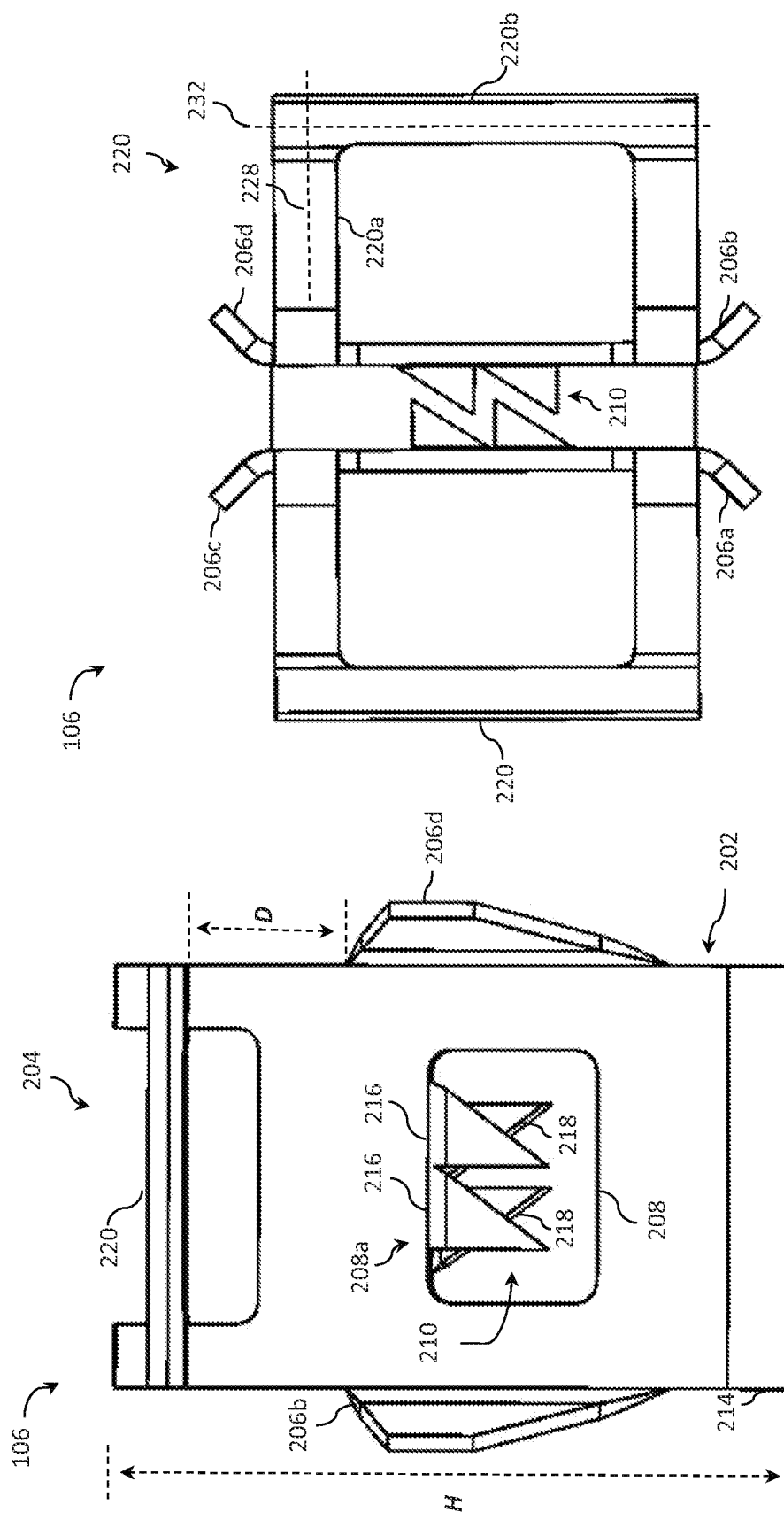

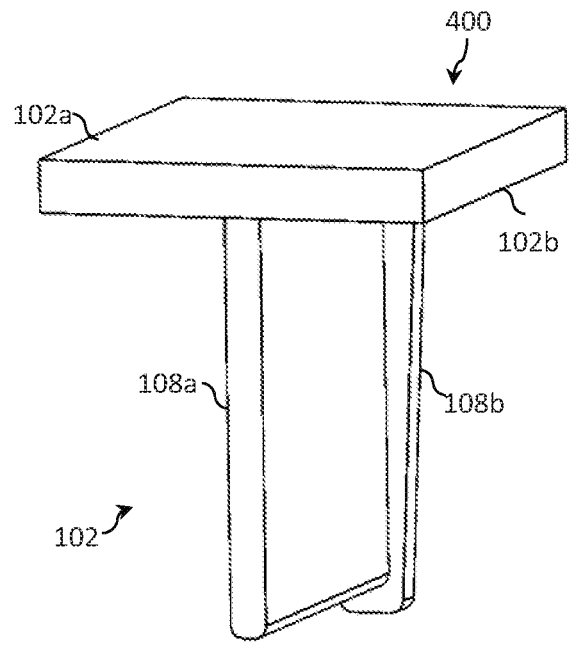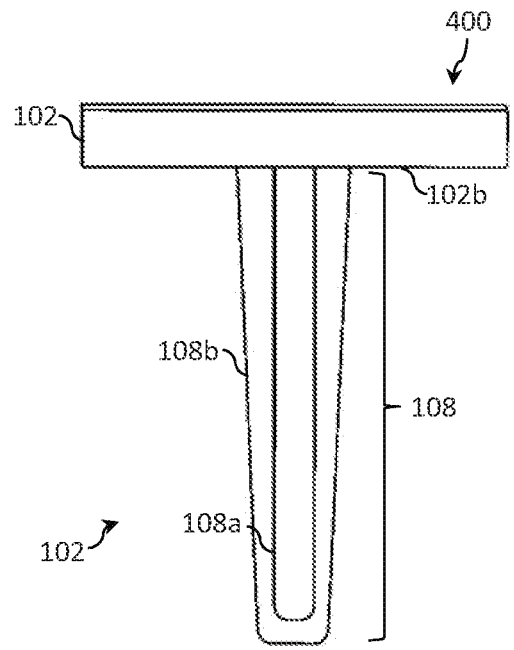
FIG. 4a    FIG. 4b
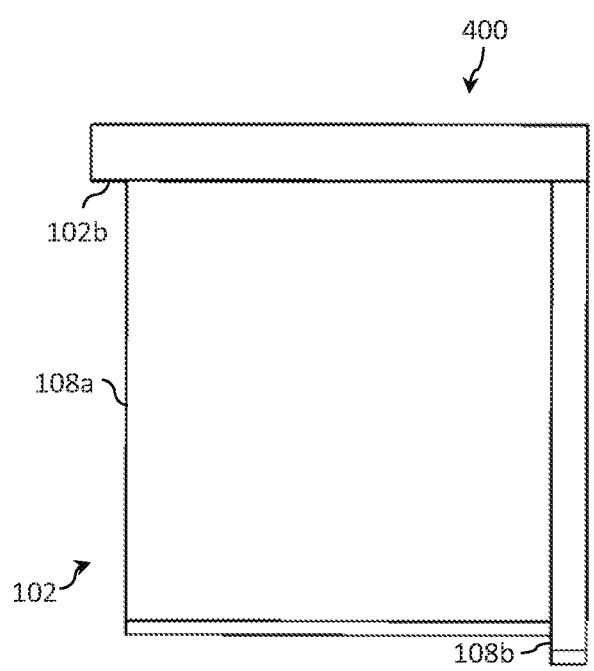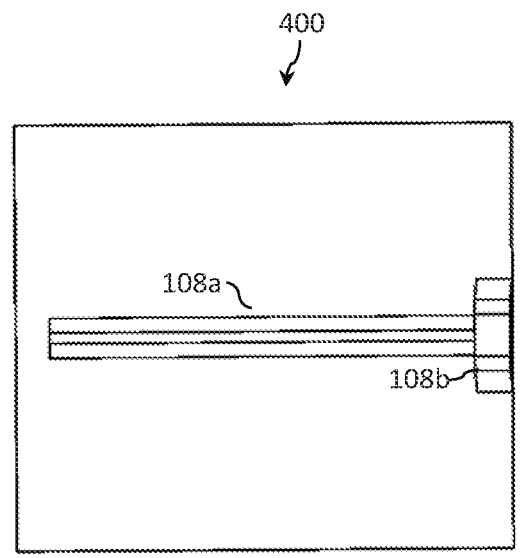
FIG. 4c    FIG. 4d

STAMPED METAL TRIM RETAINER

CROSS-REFERENCE

The present application claims the benefit under 35 U.S.C. § 119(e) of U.S. Provisional Patent Application Ser. No. 62/984,412, filed Mar. 3, 2020 and titled "Stamped Metal Trim Retainer," the contents of which are hereby incorporated by reference.

BACKGROUND

A metal retainer can be used to make a blind connection between panels, such as automotive panels. Traditionally, a simple metal retainer can be received within an opening (e.g., a window or aperture) formed in a primary panel and configured to engage a blade structure that extends from an undersurface of a secondary panel. Existing metal retainers are deficient in that the abrasive nature of the metal retainers often wears through the paint or anticorrosive coatings of the primary panel (e.g., the sheet metal framework of a vehicle), thereby promoting corrosion.

In addition, metal retainers have a tendency to buzz, squeak, and rattle, a condition typically referred to as "BSR." In an effort to reduce or eliminate BSR and to prevent corrosion, plastic retainers can be used as a replacement for metal retainers. Such plastic retainers, however, can be relatively complex, require complex tooling and molding operations, and sometimes require moderately high insertion forces to seat a blade structure therein. In some examples, retainers are fabricated using metal and plastic components to mitigate abrasion and avoid BSR. Such fasteners, however, are typically larger and can be more difficult to manufacture.

In view of the foregoing, a need exists for a retaining system with a retainer that offers the manufacturing and structural benefits of metal retainers, while being smaller in size to facilitate use in locations where space is restricted or otherwise limited, obviating the need for complex plastic retainers, and avoiding BSR.

SUMMARY

The present disclosure relates generally to a retaining system to form a blind connection between the panels, such as automotive panels, substantially as illustrated by and described in connection with at least one of the figures, as set forth more completely in the claims.

DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

FIG. 1a is a perspective view of an example retaining system in accordance with aspects of this disclosure.

FIG. 1b is a frontal view of the retaining system of FIG. 1a.

FIG. 1c is a perspective assembly view of the retaining system of FIG. 1a.

FIG. 2a is a perspective view of the retainer of the retaining system of FIG. 1a.

FIG. 2b is a frontal view of the retainer of FIG. 2a.

FIG. 2c is a side view of the retainer of FIG. 2a.

FIG. 2d is a top plan view of the retainer of FIG. 2a.

FIG. 2e is a bottom plan view of the retainer of FIG. 2a.

FIG. 3a is a perspective view of an attachment region of the second panel of the retaining system of FIG. 1a.

FIG. 3b is a frontal view of the attachment region of FIG. 3a.

FIG. 3c is a top plan view of the attachment region of FIG. 3a.

FIG. 3d is a bottom plan view of the attachment region of FIG. 3a.

FIG. 4a is a perspective view of a bezel of the first panel of the retaining system of FIG. 1a.

FIG. 4b is a frontal view of the bezel region of FIG. 4a.

FIG. 4c is a side view of the bezel region of FIG. 4a.

FIG. 4d is a bottom plan view of the bezel region of FIG. 4a.

DESCRIPTION

Figure 1C:
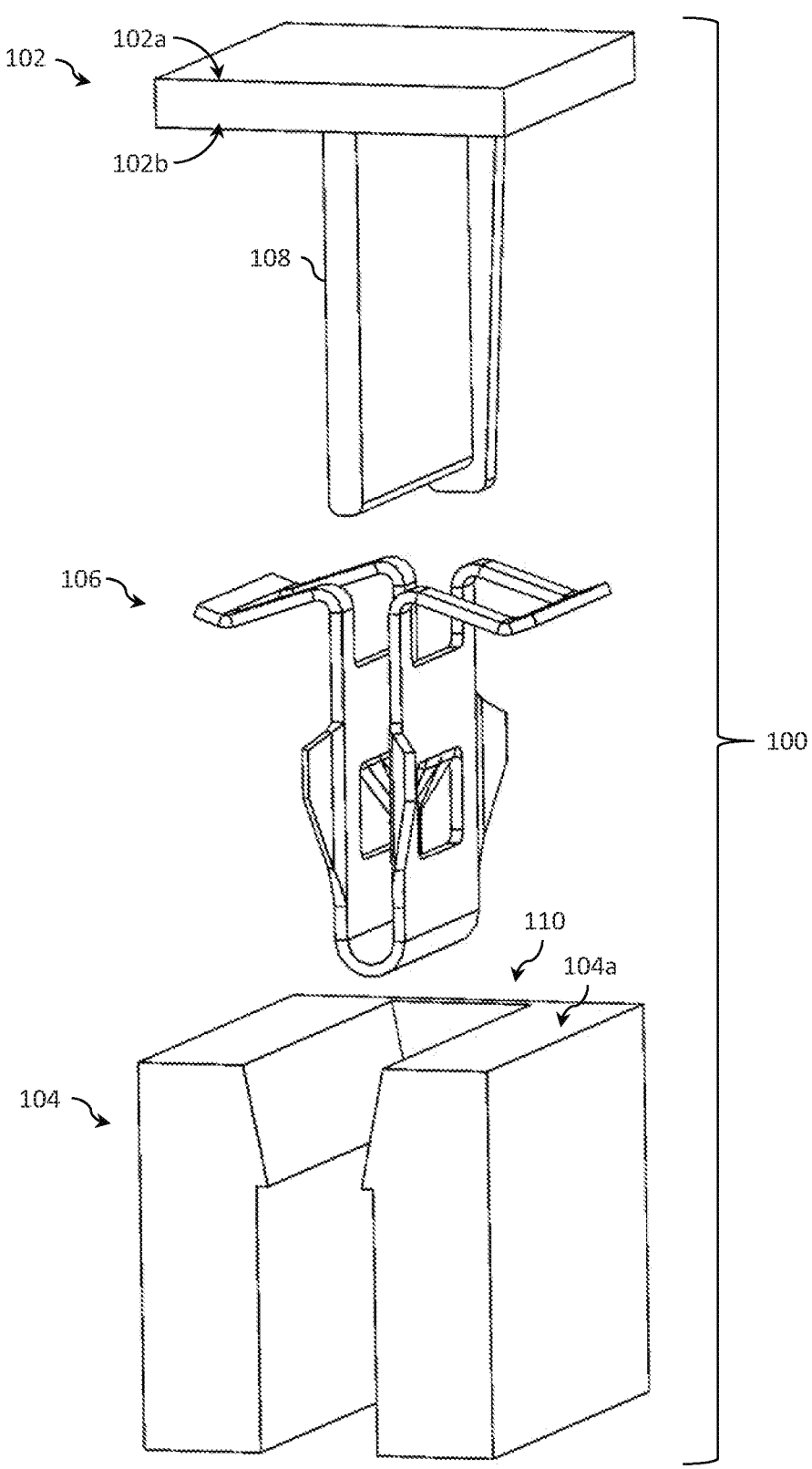

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within and/or including the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms. For example, while in some examples a first side is located adjacent or near a second side, the terms "first side" and "second side" do not imply any specific order in which the sides are ordered.

The terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the disclosure. The use of any and all examples, or exemplary language ("e.g.," "such as," or the like) provided herein, is intended merely to better illuminate the disclosed examples and does not pose a limitation on the scope of the disclosure. The terms "e.g.," and "for example" set off lists of one or more non-limiting examples, instances, or illustrations. No language in the specification should be construed as indicating any unclaimed element as essential to the practice of the disclosed examples.

The term "and/or" means any one or more of the items in the list joined by "and/or." As an example, "x and/or y"

means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

A retainer can be used to form a blind connection between a first panel and a second panel, such as automotive panels. In some examples, the retainer includes a body portion, a pair of flanges, a plurality of wings, and a retaining tab (or plural retaining tabs). The body portion may have a pair of legs spaced apart and flexibly connected to one another at a first end of each of the pair of legs to define a channel. The pair of legs may be parallel to one another. The channel is configured to receive a bezel associated with the first panel. Each of the pair of flanges is connected to and extends outwardly from a second end of the respective leg of the body portion. Each of the plurality of wings is coupled to one of the pair of legs and may be canted outwardly from the body portion. The one or more retaining tabs extend inwardly from one of the pair of legs to the channel to engage, for example, the bezel. The bezel may be a blade (e.g., a blade fastener) that extends from a B-surface of the first panel The pair of flanges may be shaped as a spring to absorb movement between the first panel and the second panel. For example, each of the pair of flanges may comprise an arm portion (e.g., linear segment) that is canted to form an acute angle with a leg plane of the respective leg of the body portion. In some examples, the acute angle is between about 15 and 35 degrees. Each of the plurality of wings may be configured to engage a retaining ledge of the second panel. In some examples, the body portion defines a lateral plane passing through the channel and each of the plurality of wings cants outwardly from the lateral plane at an angle that is between about 40 and 90 degrees. In some examples, at least one of the pair of legs is shaped to define an aperture and the retaining tab. The retaining tab(s) may be arranged to engage and retain the bezel within the channel. In some examples, each of the pair of legs comprises at least one retaining tab. In other examples, only a single retaining tab is used.

A method of coupling a first panel to a second panel using the retainer may comprise first inserting a body portion of the retainer into an opening defined in the second panel to form, for example, a part-in-assembly. Once the part-in-assembly is formed, the bezel of the first panel can then be inserted into the channel to form the blind connection.

The retainer may be a stamped metal retainer. To that end, a method of manufacturing the retainer may include one or more steps. For example, a sheet of metal may be stamped to form a die cutout for the retainer. The die cutout, which is initially flat and resides in a plane, is cut and/or shaped during the stamping process to define portions that correspond to the shape(s) for a pair of flanges, a plurality of wings, and at least one retaining tab. The retaining tab portion(s) of the die cutout is bent (e.g., along a line) in a first direction to an angle relative to the plane that is between about 10 and 80 degrees, for example. Each of the plurality of wings is then bent in a second direction that is opposite the first direction to an angle relative to the plane that is between about 30 and 90 degrees, for example. Next, each of the pair of flanges is bent in the second direction to an angle relative to the plane that is between about 20 and 45 degrees, for example. Finally, the die cutout is bent along a lateral plane (e.g., at its midpoint) to define a pair of parallel legs. The pair of parallel legs are spaced apart to define a channel such that the retaining tab is arranged to extend inwardly from one of the pair of parallel legs and into the channel. In some examples, a first portion of each of the pair of flanges is bent to an angle relative to a second portion of each of the pair of flanges that is between about 140 and 160 degrees.

FIGS. 1a and 1b illustrate, respectively, perspective and frontal views of an example retaining system 100 assembled in accordance with aspects of this disclosure, while FIG. 1c illustrates an assembly diagram of the retaining system 100. As illustrated, the retaining system 100 generally comprises a first panel 102 that is coupled to a second panel 104 via a retainer 106 (e.g., a clip) to form a blind connection between the first panel 102 and the second panel 104. As will become apparent, it is useful to assemble second panel 104 and first panel 102 by first inserting the retainer 106 into the opening 110 of the second panel 104 and then subsequently inserting a bezel 108 of the first panel 102 into the retainer 106.

The retainer 106 disclosed herein may be used to form a blind connection between various types of panels. Depending on the application, the first panel 102 and the second panel 104 may be fabricated from, for example, metal (or a metal alloy), synthetic or semi-synthetic polymers (e.g., plastics, such as acrylonitrile butadiene styrene (ABS) and polyvinyl chloride (PVC), etc.), composite materials (e.g., fiber glass), or a combination thereof. In one example, the first panel 102 is an automotive secondary panels and the second panel 104 is an automotive primary panel. In the automotive industry, example first panels 102 include, without limitation, door trim panels, moldings, trim pieces, and other substrates (whether use on the interior and exterior surfaces).

The first panel 102 may define an A-surface 102a and a B-surface 102b (illustrated as an undersurface). The A-surface 102a, also called a class A surface, is typically the surface that is visible after assembly and, for that reason, is more aesthetically pleasing (e.g., textured, coated, or otherwise decorated) and typically free of attachment devices and/or related features. Conversely, the B-surface 102b, also called a class B surface, is typically the surface that is not visible after assembly and typically includes various attachment devices and/or related features.

The first panel 102 may be include, define, or otherwise be associated with attachment devices and/or related features, such as one or more bezels 108. For example, the first panel 102 may include one or more bezels 108 that protruded from the B-surface 102b. Each bezel 108 (sometimes called a tower or protrusion) may be shaped as a blade or planar tab, for example. Depending on the material type, the one or more bezels 108 may be formed on the B-surface 102b during molding or layup of the first panel 102, or attached after fabrication (e.g., using adhesive or mechanical fasteners). After assembly, the second panel 104 is covered at least partially by the first panel 102. The second panel 104 may be, for example, a structural component of a vehicle, such as doors, pillars (e.g., an A-pillar, B-Pillar, C-Pillar, etc.), dashboard components (e.g., a cross member, bracket, frame, etc.), seat frames, center consoles, fenders, sheet metal framework, or the like.

To form the blind connection between the first panel 102 and the second panel 104, the retainer 106 is first inserted into an opening 110 formed in or on a surface 104a of the second panel 104 to define a part-in-assembly (PIA). Once the retainer 106 is inserted into opening 110, the bezel 108 of the first panel 102 can be inserted into a channel formed by the retainer 106 to, in effect, lock the retainer 106 in place, thus securing the first panel 102 and the second panel 104 to one another. As best illustrated in FIG. 1*b*, the retainer 106 may further engage one or more features of the second panel 104, for example, at one or more points (identified in the Figures as Point A).

An advantage of first installing the retainer 106 in the second panel 104 to form a PIA and then attaching the first panel 102 to the PIA is that it allows for a smaller size retainer 106 to be used than was previously possible. As a result, the retaining system 100 may be used in areas where space is restricted or otherwise limited (e.g., the interior panel in and around the pillars). While retainers are traditionally assembled to the first panel 102 prior to assembling to the second panel 104, such a configuration results in a larger retainer because the retainer itself must also include a bezel structure that is internal to the retainer at the time of assembly. Further, current designs utilize flat planar bezels, which ought to be co-planar and collinear to the opening in the second panel 104.

In addition to a smaller size retainer 106, the opening 110 can be sized and shaped to also reinforce the retainer 106 in resisting removal. For example, by assembling the retainer 106 to the second panel 104 prior to assembling the first panel 102, a narrower opening 110 can be used as the bezel 108 is no longer dictating the size of the retainer 106. Therefore, the retainer 106 is installed to the second panel 104 first and the first panel 102 is attached second, allowing for a smaller size retainer 106 to be used than previously capable as well as using the opening 110 to reinforce the retainer 106 in place to resist removal.

FIGS. 2*a* through 2*e* illustrate, respectively, perspective, frontal, side, top plan, and bottom plan views of a retainer 106 in accordance with an aspect of this disclosure. The retainer 106 may be a stamped metal retainer. For example, a flat sheet of metal may be stamped (e.g., die stamped) to define the outer perimeter, profile, and cutouts to define the various features of the retainer 106. After stamping, the flat sheet of metal may be bent along one or more lines or at one of more points through one or more steps to define the retainer 106. An example method will be described in connection with the method 600 of FIG. 6.

As illustrated, the retainer 106 generally comprises a body portion 202 and a retaining head portion 204. The body portion 202 is formed from a pair of opposing legs 212 that are resiliently connected at their bottom ends 202*a* via a connecting portion 214 (e.g., a portion that defines the bend, joint, etc.) to form, in one example, a generally U-shaped body having a channel 236 (e.g., a U-shaped channel) therebetween. The pair of opposing legs 212 are resiliently connected in that the pair of opposing legs 212 default (e.g., spring back) to a predetermined shape. For example, as best illustrated in FIG. 2*b*, the body portion 202 has a cross section that is generally U-shaped. During assembly, the legs 212 may be biased (e.g., pushed) inward and/or outward, but, in the absence of such external forces, return to the generally U-shaped shape. As illustrated, the pair of legs 212 are generally parallel to one another. For example, the pair of legs 212 defines a pair of leg planes 222 that are generally parallel to one another (and, as illustrated, to the lateral plane 224). Alternatively, the legs 212 may be angled or biased outwardly at the upper end 202*b* such that the leg planes 222 of the pair of legs 212 form an angle (α) with one another that is acute.

Figure 2E:
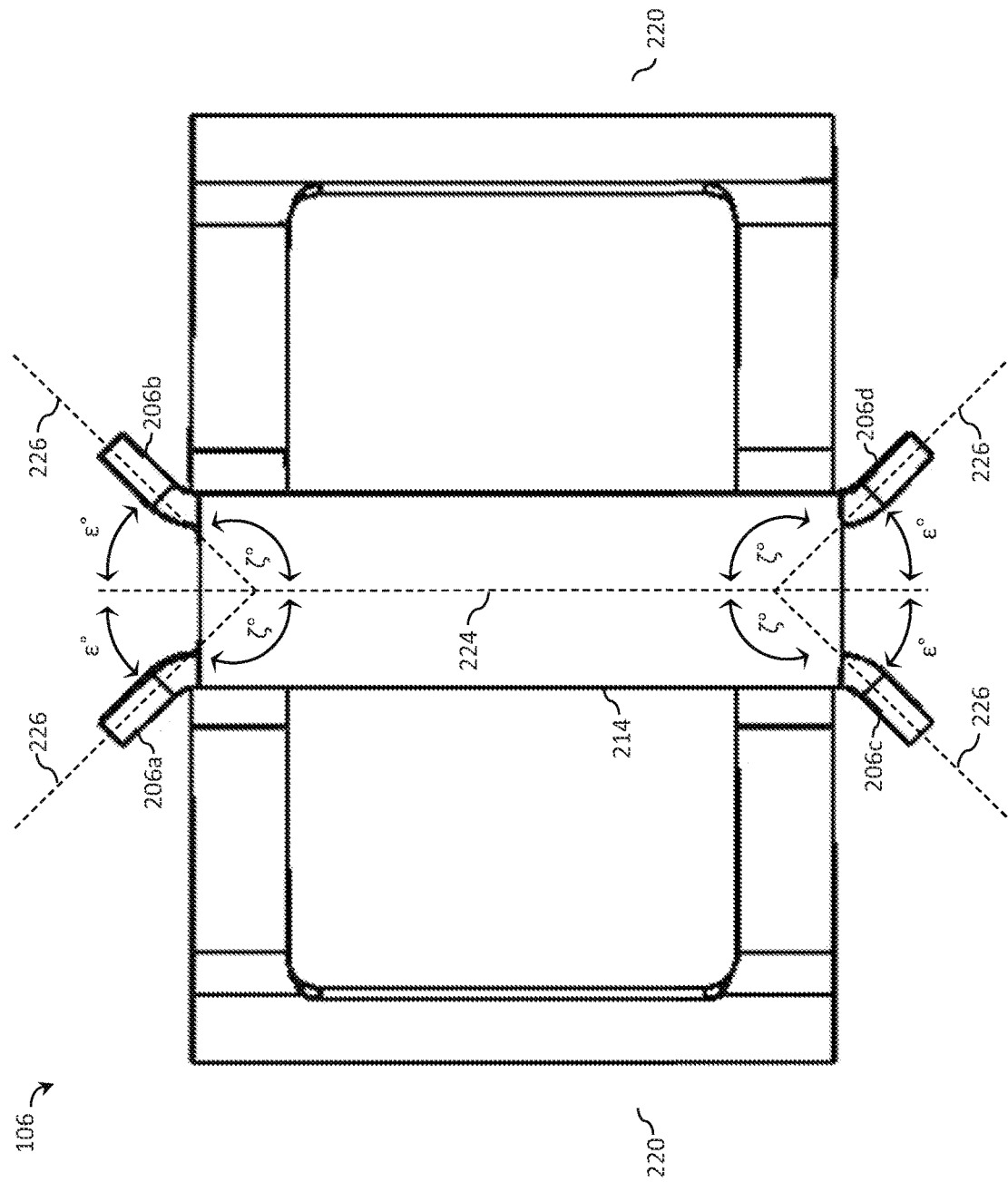
Figure 3A:
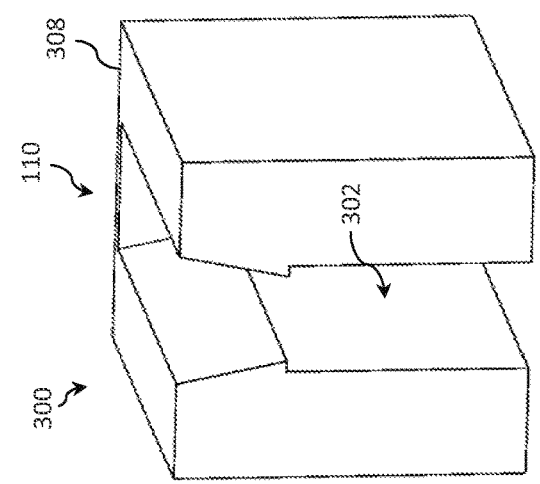
Figure 3B:
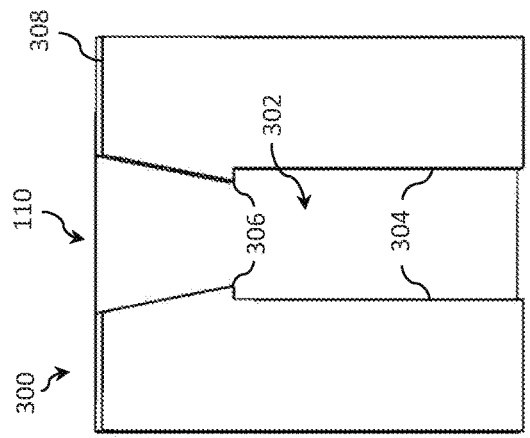
Figure 3C:
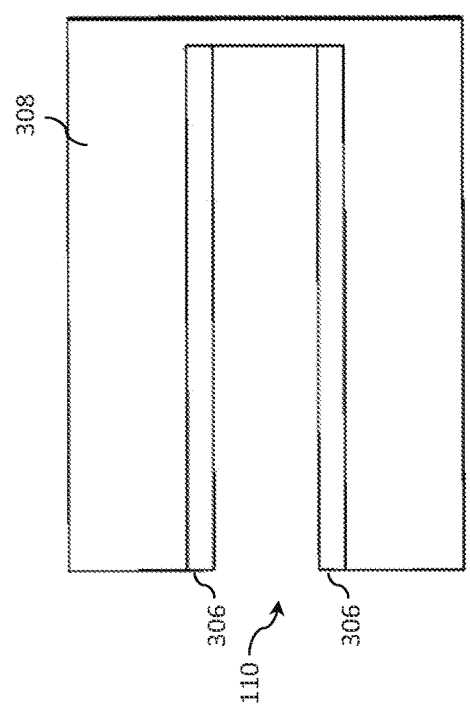
Figure 3D:
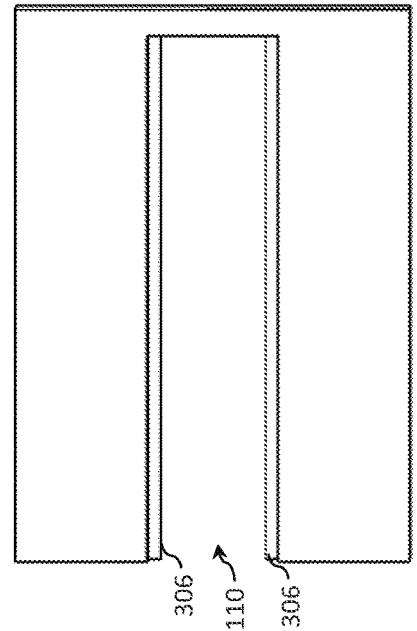

Each of the legs 212 has one or more flanges 220 extending outwardly from its top end 202*b*, the set of flanges 220 form the retaining head portion 204 of the retainer 106. Each flange 220 may be shaped as a spring and configured to absorb movement between the first and second panels 102, 104 once assembled, while also increasing manufacturing tolerances. Absorbing movement offers advantages, such as noise-reduction to limit BSR (e.g., fewer squeaks, creaks, etc.) and mitigating risk of the retaining system 100 becoming loose. To that end, as best illustrated in FIGS. 2*d* and 2*e*, each flange 220 may be generally U-shaped when viewed from above or below in that it comprises a set of arm portions 220*a* coupled to one another at their distal ends via a cross member portion 220*b*. Each of the arm portions 220*a* is illustrated as rectangular, planar portion (e.g., a strip) that defines a longitudinal axis 228. Similarly, the cross member portion 220*b* is illustrated as rectangular, planar portion that defines a lateral axis 230 and a longitudinal axis 232 that is transverse (perpendicular in the illustrated example) to the longitudinal axes 228 of the arm portions 220*a*.

The set of arm portions 220*a* may be canted (e.g., bent and/or angled) along a line downward relative to leg plane 222 of the leg 212 by an angle (δ) (e.g., an acute angle). The angle (δ) formed between the leg plane 222 and the longitudinal axis 228 may be, for example, between about 10 and less than 90 degrees, between about 15 and 45 degrees, between about 15 and 35 degrees, or between about 15 and 35 degrees, or about 30 degrees.

The cross member portion 220*b* may be canted upward along a line relative to the set of arm portions 220*a* as best illustrated in FIG. 2*b*. For example, the lateral axis 230 of the cross member portion 220*b* may be canted upward relative to the longitudinal axis 228 of each of the set of arm portions 220*a* to define an angle (γ). The angle (γ) formed between the lateral axis 230 and the longitudinal axis 228 may be, for example, between about 90 and 180 degrees, between about 140 and 160 degrees, or between about 145 and 155 degrees.

In some aspects, each of the legs 212 has an aperture 208 formed therethrough. While the size and shape of the aperture 208 can vary, the aperture may be generally rectangular (as illustrated), square, or another polygon. Within the aperture 208 of one or both legs 212 there exists one or more retaining tabs 210 (e.g., barbs or teeth), each defining a longitudinal axis 234 between its base (attachment point) and tip. While each of the legs 212 is illustrated with one or more retaining tabs 210, one of skill in the art would understand that only one of the two legs 212 may be provided with a retaining tabs 210. In such an example, rather than being sandwiched between two retaining tabs 210, the bezel 108 may be secured against (e.g., biased toward) a first leg 212 using a retaining tab 210 of a second leg 212.

The one or more retaining tabs 210 extend downwardly and inwardly from an upper surface 208*a* forming each of the apertures 208. As illustrated, the one or more retaining tabs 210 are inclined inward and toward the bottom ends 202*a* of the pair of legs 212. In some examples, the aperture 208 may be omitted. For example, one or both of the pair of legs 212 may be stamped to define one more retaining tabs 210 without the aperture 208.

The retaining tabs 210 can be connected to its respective leg 212 at its base end 216 at the upper surface 208*a* of the aperture 208 (e.g., the surface of the apertures 208 proximate the retaining head portion 204). The retaining tabs 210 on opposite sides of the channel 236 may be symmetrical with respect to one another. On other examples, the one or more retaining tabs 210 may be provided on only one side of the channel 236. The retaining tab 210 may be formed, for example, during a stamping process and bent inward toward the channel 236. Therefore, the retaining tab 210 may integral with its respective leg 212. The tips 218 of each retaining tab 210 may be of any suitable shape, but may be provided with at least one sharp edge to better grasp the bezel 108 upon assembly.

The retaining tabs 210 extend into the channel 236 inwardly by an angle (β). The angle (β) between the leg plane 222 and the longitudinal axis 234 may be, for example, between about 0 and 180 degrees, between about 90 and 180 degrees, between about 100 and 170 degrees, or between about 120 and 150 degrees. With reference to FIGS. 2c and 2d, while two retaining tabs 210 are show in each aperture 208, any suitable number of retaining tabs 210 may be utilized.

The retainer 106 is designed to be installed into a second panel 104 with an opening 110, which may be rectangular or any other suitable shape. The bezel 108 of the first panel 102 is then pressed into the channel 236 formed by the body portion 202 such that the retaining tab(s) 210 interact with the bezel 108 to resist the bezel 108 (and therefore the first panel 102) from being removed from the channel 236. As noted above, installing the retainer 106 first within the second panel 104 first and then within the first panel 102 allows for both a smaller-sized retainer 106 and opening 110. The bezel 108 reinforces the retainer 106 and provides resistance to removal of the retainer 106 from the second panel 104. Further, the bezel 108 becomes integral to the retaining system 100 by preventing the retainer 106 from being able to extract from the second panel 104. Furthermore, the design of the retainer 106 allows for non-rectangular opening 110 as well as non-planar bezels 108.

Additionally, the retainer 106 may be configured to engage one or more features of the second panel 104. In one example, as best illustrated in FIG. 2e, the retainer 106 incorporates a plurality of wings 206 (e.g., first, second, third, and fourth wings 206a, 206b, 206c, 206d) extending outwardly from each of the legs 212 of the body portion 202. For example, each of the plurality of wings 206 may attached to an edge or side of a leg 212.

Each of the plurality of wings 206 is oriented vertically relative to the body portion 202. In the illustrated example, the plurality of wings 206 are arranged to define a generally X-shaped pattern when viewed from the top or bottom, but other shapes and angles are contemplated. While four wings 206 are illustrated (e.g., one at each corner of the body portion 202), additional or fewer wings 206 may be utilized. The plurality of wings 206 are configured to engage the second panel 104 (e.g., the retaining ledge 306, as illustrated in FIGS. 3a through 3e).

Each wing 206 may be oriented an angle (ε) relative to the lateral plane 224 of the body portion 202 that passes along/through the channel 236 to define an angle (ε). The angle (ε) formed between the lateral plane 224 and the wing axis 226 may be, for example, between about 0 and 90 degrees, between about 30 and 60 degrees, between about 40 and 90 degrees, between about 40 and 50 degrees, or about 45 degrees. The angle (ε) and angle (ζ) may be adjusted depending on the shape of the opening 110 and to increase contact between the wing(s) 206 and the second panel 104 in a particular direction. In the illustrated example, angle (ε) and angle (ζ) are supplementary angles.

The retainer 106 may be fabricated in various sizes depending on the application. In some example, the retainer 106 has a width (W) that is less than its height (H), where the height (H) is measured from the retaining head portion 204 to the connecting portion 214 at the bottom end 202a of the pair of legs 212. In other examples, the retainer 106 has a width (W) that is greater than the height (H).

FIGS. 3a through 3d illustrate, respectively, perspective, frontal, top plan, and bottom plan views of an attachment region 300 of the second panel 104 of the retaining system 100 of FIG. 1a. While only a single attachment region 300 is illustrated, it should be appreciated that a given second panel 104 may include multiple attachment regions 300, depending on the number of retainers 106 to be used between the first and second panels 102, 104. As illustrated, the second panel 104 is sized at shaped at the attachment region 300 to define the opening 110 and a cavity 302 between a set of sidewalls 304. Each sidewall 304 may include one or more features configured to engage the retainer 106, such a retaining ledge 306. The opening 110 can be generally rectangular and will have a size that is complementary to that of the retainer 106 so that the retainer 106 may be inserted and retained therein. However, openings 110 of other shapes are contemplated. The thickness of the second panel 104 can dictate the height (H) of the retainer 106 and distance (D) between the retaining head portion 204 and the upper edge of the wing(s) 206 of each leg 212.

FIG. 4a through 4d illustrate, respectively, perspective, frontal, side, and bottom plan views of an attachment region 400 of the first panel 102 of the retaining system 100. While only a single attachment region 400 is illustrated, it should be appreciated that a given first panel 102 may include multiple attachment regions 400, depending on the number of retainers 106 to be used between the first and second panels 102, 104. The bezel 108 extends from the B-surface 102b of the first panel 102. Each bezel 108 may be generally shaped as a blade or tab, for example. The bezel 108 may be of any suitable size or shape such that it can be constructed and arranged to engage the tips 218 of the retaining tabs 210 of the retainer 106. The bezel 108 may be composed of, for example, a primary portion 108a and a secondary portion 108b. The primary portion 108a is generally planar to define the blade shape, while the secondary portion 108b may be shaped to define a thicker edge of the primary portion 108a to increase rigidity of the bezel 108 and to assist when guiding the bezel 108 into the channel 236 of the retainer 106.

Figure 5:
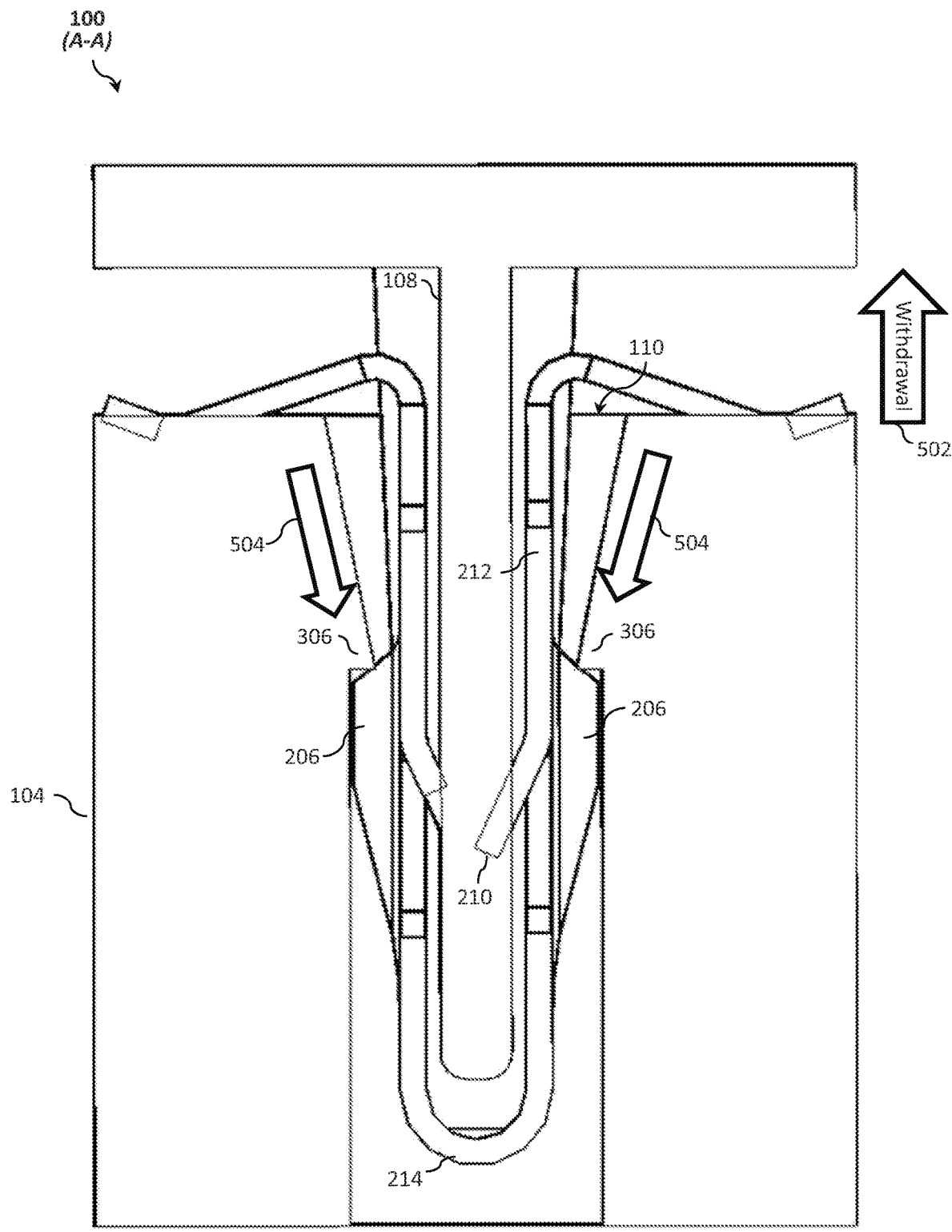
FIG. 5 is cut away frontal view of the retainer taken along cutting lines A-A shown in FIG. 1c.

FIG. 5, which is a cut away frontal view of the assembled retaining system 100 taken along cutting lines A-A shown in FIG. 1c, best illustrates how the bezel 108 is retained within the retainer 106 of the retaining system 100. FIG. 5 is a schematic illustration of the retaining system 100 and, therefore, the dimensions and clearances illustrate should not be taken as a literal representation of the preferred examples. It is to be understood, however, that the present retaining system 100 may be adapted for use with structures other than the illustrated second panel 104 and first panel 102 that do not require the blind connection described herein. Accordingly, the present retaining system 100 is not to be limited to only blind connections.

The connection between the first panel 102 and the second panel 104 will generally be a blind connection, i.e., the retainer 106 extends from an B-surface 102b of the first panel 102 and cannot be seen by one who is assembling the first panel 102 to the second panel 104. During assembly, the body portion 202 of the retainer 106 is first inserted within the cavity 302 to engage the retaining ledge 306 (or another feature) via the wing(s) 206. As illustrated, when the body portion 202 is inserted into an opening 110 formed in the second panel 104, the flanges 220 contact a first side 308 (e.g., an outer surface) of the second panel 104. Once the retainer 106 is assembled with the second panel 104 as a PIA, the bezel 108 may be inserted into the channel 236 of the retainer 106.

As the bezel 108 is inserted into the retainer 106, the bezel 108 passes between the retaining tabs 210 of the legs 212 to bias the legs 212 outwardly. As the legs 212 bias outwardly, the retainer 106 engages the retaining ledge 306 of the second panel 104. As the bezel 108 is inserted between the legs 212 of the retainer 106, the retaining tabs 210 will be biased outwardly by the tip and then sides of the bezel 108. In this example, the pair of retaining tabs 210 are configured to engage the bezel 108 to oppose a withdrawal force applied to the bezel 108 via the pair of retaining tabs 210 such that substantially all of the withdrawal force is borne by the pair of retaining tabs 210 in compression. As can be seen, the bezel 108 is inserted fully into the channel 236 formed between the legs 212 of the retainer 106.

When the B-surface 102b of the first panel 102 contacts the upper surface of the retaining head portion 204 or is sufficiently close to the retaining head portion 204, the tips 218 of the retaining tabs 210 will remain biased outward. Once the bezel 108 is fully seated within the retainer 106, the retaining tabs 210 act to prevent the first panel 102 and second panel 104 from being easily separated. For example, when withdrawal force indicated by arrow 502 is applied to the first panel 102, the interaction between the wings 206 and retaining ledge 306 will generate opposing forces indicated by arrows 504. In some examples, the pair of legs 212 of the body portion 202 of the retainer 106 may be biased outwardly via the connecting portion 214 to cause at least a portion of the plurality of wings 206 to further engage a feature (e.g., the retaining ledge 306) of the second panel 104 so as to securely retain the retainer 106 within an opening 110 formed in the second panel 104.

The wings 206 are angled and the retaining tabs 210 are essentially cantilever structures that extend from the legs 212 of the retainer 106 proximate to the retaining head portion 204 thereof. The flexible nature of the retaining tabs 210 and angles of the wings 206 permit a relatively low insertion force required to insert the bezel 108 into the retainer 106. In some example, the insertion force may be about two pounds. In the illustrated example, the retainer 106 defines two sets of retaining tabs 210 that engage the bezel 108. However, it is to be understood that the retainer 106 may comprise any number of retaining tabs 210 (even one). The retaining tabs 210 of the retainer 106 may engage a planar surface of the bezel as illustrated or, in some examples, one or more features formed in or on the surface of the bezel 108. For example, the bezel 108 may comprise one or more bumps, recesses, apertures, or ledges to increase friction between the bezel 108 and the retaining tabs 210.

Figure 6:
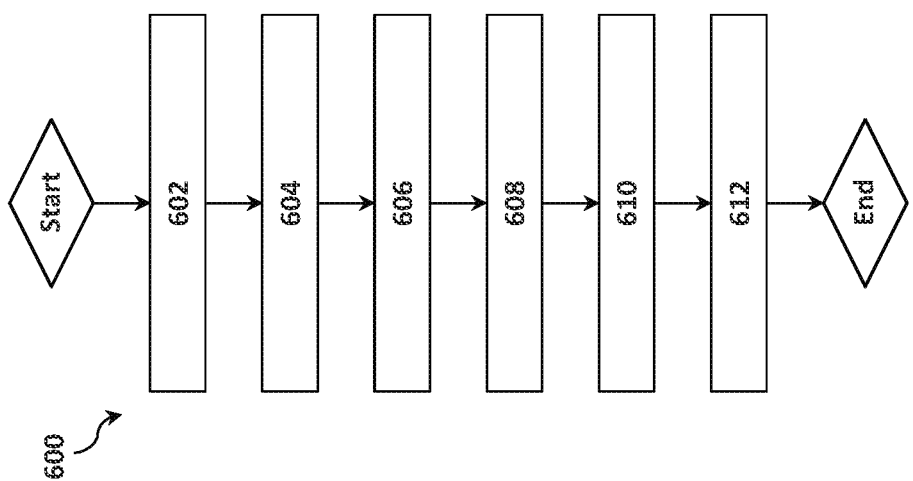
FIG. 6 is a flowchart representative of an example method of manufacturing the retainer of FIG. 2a through 2e.

FIG. 6 illustrates a method 600 of manufacturing a retainer 106 to couple a first panel 102 to a second panel 104. At step 602, a sheet of metal is stamped to form a die cutout for the retainer 106. The die cutout is generally planar and resides in a plane (e.g., a single plane) and is shaped to define portions that correspond to the various components of the retainer 106, such as a pair of flanges 220, a plurality of wings 206, and one or more retaining tabs 210. The sheet of metal may be stamped via a press and die. In other examples, the die cutout may be cut from sheet of metal using lasers, water jets, jigsaw, etc.

At step 604, each of the one or more retaining tabs 210 is bent along a fold line in a first direction to a first angle relative to the plane. The first angle may be, for example, angle ($\beta$) or the supplementary angle thereto.

At step 606, each of the plurality of wings 206 is bent along a fold line in a second direction that is opposite the first direction to a second angle ($\epsilon$) relative to the plane.

At step 608, each of the pair of flanges 220 is bent along a fold line in the second direction to a third angle ($\delta$) relative to the plane.

At step 610 the die cutout is bent along a fold line at the lateral plane 224 to define the pair of parallel legs 212. The bend at the connecting portion 214 defines a radius such that the pair of legs 212 is spaced apart to define the channel 236. Each of the one or more retaining tabs 210 is arranged to extend inwardly from one of the pair of legs. In some examples, the flanges 220 comprise two or more portions (e.g., arm portion 220a and cross member portion 220b) that are angled relative to one another to form a spring. In this example, at step 612, the first portion of each of the pair of flanges 220 is bent to a fourth angle ($\gamma$) relative to the second portion of each of the pair of flanges 220.

Figure 7:
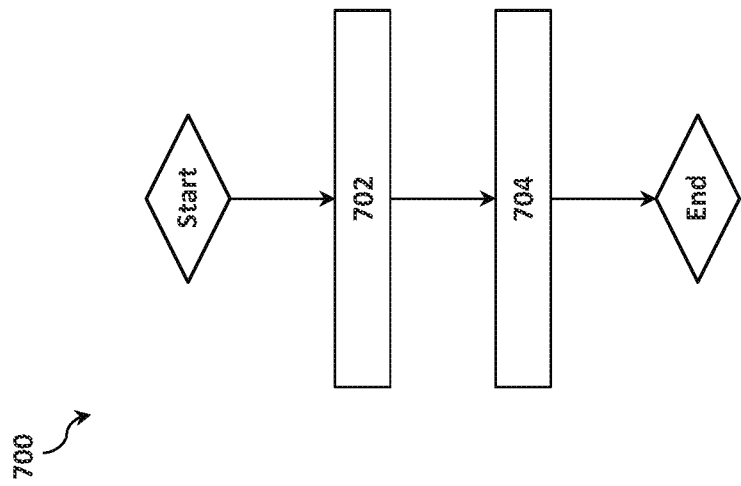
FIG. 7 is a flowchart representative of an example a method of coupling a first panel to a second panel using the retainer of FIG. 2a through 2e.

FIG. 7 illustrates a method 700 of coupling a first panel 102 to a second panel 104 using a retainer 106. At step 702, the body portion 202 of the retainer 106 is inserted into an opening 110 defined in the second panel 104. In one example, the body portion 202 comprises a pair of legs 212 spaced apart and flexibly connected to one another to define a channel 236, a plurality of wings 206 coupled to and canted outwardly from the body portion 202, and one or more retaining tabs 210 extending inwardly from the pair of legs 212. At step 704, the bezel 108 of the first panel 102 is inserted into the channel 236. The one or more retaining tabs 210 extend from one of the pair of legs 212 to engage the bezel 108 in the channel 236. Each of the plurality of wings 206 is configured to engage, for example, a retaining ledge 306 of the second panel 104 when the bezel 108 is inserted in the channel 236. The pair of flanges 220 may be shaped as a spring to absorb movement between the first panel 102 and the second panel 104.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

The invention claimed is:

1. A retainer to couple a first panel to a second panel, the retainer comprising: a body portion having a pair of legs spaced apart and flexibly connected to one another at a first end of each of the pair of legs to define a channel having a lateral plane passing through the channel, wherein the channel is configured to receive a bezel associated with the first panel; a pair of flanges, wherein: each of the pair of flanges is connected to and extends outwardly from a second end of the respective leg of the body portion, and each of the pair of flanges comprises an arm portion that is canted to form an acute angle with a plane of the respective leg of the body portion; a plurality of wings, each of the plurality of wings coupled to an outer edge of one of the pair of legs and canted outwardly from the body portion at an angle relative to the lateral plane that is between about 30 and 60 degrees; a retaining tab extending inwardly from one of the pair of legs to the channel; and wherein each of the pair of flanges is shaped as a spring to absorb movement between the first panel and the second panel.

2. The retainer of claim 1, wherein the acute angle is between about 15 and 35 degrees.

3. The retainer of claim 1, wherein each of the plurality of wings is configured to engage a retaining ledge of the second panel.

4. The retainer of claim 3, wherein the plurality of wings are arranged to define a generally X-shaped pattern.

5. The retainer of claim 3, wherein at least one of the pair of legs is shaped to define an aperture and the retaining tab.

6. The retainer of claim 3, wherein the retaining tab is arranged to engage and retain the bezel within the channel.

7. The retainer of claim 3, wherein the pair of legs are parallel to one another.

8. The retainer of claim 3, wherein each of the pair of legs comprises at least one retaining tab.

9. The retainer of claim 3, wherein the retainer is a stamped metal retainer.

10. The retainer of claim 3, wherein the bezel is a blade that extends from a B-surface of the first panel.

11. The retainer of claim 3, wherein:
the arm portion of each flange is a first arm portion;
each flange further comprises a second arm portion; and
each of the first and second arm portions of each flange are coupled to one another at a distal end of each arm portion via a cross member portion.

12. The retainer of claim 11, wherein each cross member portion of the pair of flanges defines a longitudinal axis that is transverse to a longitudinal axis of the arm portions.

13. A method of manufacturing a retainer to couple a first panel to a second panel, the method comprising:
stamping a sheet of metal to form a die cutout for the retainer, wherein the die cutout resides in a plane and is shaped to define a pair of flanges, a plurality of wings, and a retaining tab;
bending, in a first direction, the retaining tab to a third angle relative to the plane that is between about 10 and 80 degrees;
bending, in a second direction that is opposite the first direction, each of the plurality of wings to a second angle relative to the plane that is between about 30 and 90 degrees;
bending, in the second direction, each of the pair of flanges to a first angle relative to the plane that is between about 20 and 45 degrees; and
bending the die cutout along a lateral plane to define a pair of parallel legs, wherein the pair of parallel legs is spaced apart to define a channel having a lateral plane passing through the channel, and each of the plurality of wings is positioned at an outer edge of one of the pair of parallel legs at an angle relative to the lateral plane that is between about 30 and 60 degrees,
wherein the retaining tab is arranged to extend inwardly from one of the pair of parallel legs and into the channel.

14. The method of claim 13, further comprising the step of bending a first portion of each of the pair of flanges to a fourth angle relative to a second portion of each of the pair of flanges that is between about 140 and 160 degrees.

15. The method of claim 13, wherein the first angle is between about 15 and 35 degrees.

16. The method of claim 13, wherein the second angle is between about 40 and 90 degrees.

17. A method of coupling a first panel to a second panel using a retainer, the method comprising: inserting a body portion of the retainer into an opening defined in the second panel, wherein the body portion comprises: a pair of legs spaced apart and flexibly connected to one another to define a channel having a lateral plane passing through the channel, a pair of flanges, wherein each of the pair of flanges is connected to and extends outwardly from a second end of the respective leg of the body portion and wherein each of the pair of flanges comprises an arm portion that is canted to form an acute angle with a plane of the respective leg of the body portion, a plurality of wings coupled to an outer edge of one of the pair of legs and canted outwardly from the body portion at an angle relative to the lateral plane that is between about 30 and 60 degrees, and a retaining tab extending inwardly from one of the pair of legs; inserting a bezel of the first panel into the channel, wherein the retaining tab extends from one of the pair of legs to engage the bezel in the channel, wherein the retainer comprises a pair of flanges coupled to the body portion and shaped as a spring to absorb movement between the first panel and the second panel.

18. The method of claim 17, wherein each of the plurality of wings is configured to engage a retaining ledge of the second panel when the bezel is inserted in the channel.

\* \* \* \* \*